(12) United States Patent
Sakamoto et al.

(10) Patent No.: US 7,836,773 B2
(45) Date of Patent: Nov. 23, 2010

(54) OPTICAL FIBER THERMOMETER AND TEMPERATURE-COMPENSATED OPTICAL FIBER SENSOR

(75) Inventors: Akira Sakamoto, Sakura (JP); Keiichi Horimoto, Sakura (JP); Yoshikiyo Noguchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/425,943

(22) Filed: Apr. 17, 2009

(65) Prior Publication Data

US 2009/0199646 A1 Aug. 13, 2009

Related U.S. Application Data

(63) Continuation of application No. PCT/JP2007/070335, filed on Oct. 18, 2007.

(30) Foreign Application Priority Data

Oct. 18, 2006 (JP) .............................. 2006-284027

(51) Int. Cl.
*G01L 9/00* (2006.01)
(52) U.S. Cl. .......................................... 73/705; 73/708
(58) Field of Classification Search .................. None
See application file for complete search history.

(56) References Cited

U.S. PATENT DOCUMENTS

| 4,479,717 | A |   | 10/1984 | Cornillault |
| 4,576,486 | A | * | 3/1986  | Dils ............................ 374/131 |
| 5,017,772 | A |   | 5/1991  | Hafle |
| 6,433,350 | B2 |   | 8/2002 | Hwang et al. |

FOREIGN PATENT DOCUMENTS

| JP | 59030032  | A | * | 2/1984 |
| JP | 60-50402  | A |   | 3/1985 |
| JP | 62-080531 | A |   | 4/1987 |
| JP | 62071826  | A | * | 4/1987 |
| JP | 02309221  | A | * | 12/1990 |
| JP | 5-196528  | A |   | 8/1993 |
| JP | 06109547  | A | * | 4/1994 |
| JP | 06109548  | A | * | 4/1994 |
| JP | 06137965  | A | * | 5/1994 |
| JP | 06221927  | A | * | 8/1994 |
| JP | 06229834  | A | * | 8/1994 |
| JP | 06229843  | A | * | 8/1994 |
| JP | 8-062080  | A |   | 3/1996 |

(Continued)

*Primary Examiner*—Andre J Allen
(74) *Attorney, Agent, or Firm*—Sughrue Mion, PLLC

(57) ABSTRACT

Optical fiber thermometer includes one optical fiber that relays light from the light source to a measuring unit, two parallel optical fibers that relay light from a mirror at the measuring unit to two light-receiving units, and an arithmetic processing circuit that calculates the temperature of the measuring unit from the ratio of electrical signals from the two light-receiving units; end surfaces of three optical fibers facing the reflecting face being fixed at an angle θ between the longitudinal direction of the optical fibers and the normal to the reflecting face that is not zero, the angle between the optical fibers for reception and projection being symmetrical based on the normal to the reflecting face. Each of the optical fibers is a single-mode fiber at the wavelength being used.

12 Claims, 7 Drawing Sheets

FOREIGN PATENT DOCUMENTS

| | | | |
|---|---|---|---|
| JP | 08261839 A | * | 10/1996 |
| JP | 08304182 A | * | 11/1996 |
| JP | 9-5028 A | | 1/1997 |
| JP | 2002-267557 A | | 9/2002 |
| JP | 2002-372472 A | | 12/2002 |
| JP | 2006-071549 A | | 3/2006 |
| JP | 2007-024826 A | | 2/2007 |

* cited by examiner

OPTICAL FIBER THERMOMETER AND TEMPERATURE-COMPENSATED OPTICAL FIBER SENSOR

This application is a continuation application based on a PCT Patent Application No. PCT/JP2007/070335, filed Oct. 18, 2007, whose priority is claimed on Japanese Patent Application No. 2006-284027, filed Oct. 18, 2006. The contents of both the PCT Application and the Japanese Application are incorporated herein by reference.

TECHNICAL FIELD

The present invention relates to an optical fiber thermometer and a temperature-compensated optical sensor using the thermometer, and more particularly relates to a sensor that uses an optical thermometer to compensate measurement error resulting from temperature-change, and can measure various types of physical quantities, such as pressure, with high precision.

BACKGROUND ART

An optical sensor that uses an optical fiber to guide light to a measuring unit, and senses changes in the optical condition at the measuring unit, does not use electricity in the measuring unit; it therefore has advantages such as offering excellent resistance against explosion, lightening, and electromagnetic noise, and facilitating long-distance measuring. In this type of optical sensor, when the target being measured is a physical quantity other than temperature, changes in characteristics caused by changes in temperature can reduce the precision of the measuring. Therefore, to achieve high-precision measuring, effects of temperature-change must be compensated for.

Conventionally, techniques such as temperature-compensated optical fiber sensor methods using optical interference (See Patent Documents 1 and 3), and methods that measure changes in the center wavelength of a fiber grating (See Patent Document 4), are proposed. However, since a principle of these conventional techniques is to measure wavelength changes and the modulation component of light, these measuring devices are expensive Other factors making them expensive are that they require a variable-frequency light source to realize temperature-compensation (Patent Document 1), that they require a special structure (Patent Document 4), and so on.

Also proposed is a method that allows use of a less expensive measuring device by measuring changes in light power (e.g. see Patent Documents 2, 5, and 6). This method makes a target being measured reflect light emitted from an optical fiber that guides light from a light source to a sensing unit, and measures the power of light coupled in a same optical fiber.

This method has advantages that the configuration of the sensing unit is simple, and the measuring unit for measuring changes in light power can be provided comparatively inexpensively.

However, in this method, since light is also received in an optical fiber for projection, a light-branching element such as an optical coupler must be provided to make the reflected light incident to a light-receiving unit such as a photodiode. Since this light-branching element has temperature-dependency and light-source wavelength-dependency, its branching ratio changes according to changes in temperature and the light-source wavelength. As a result, the configurations of Patent Documents 2, 5, and 6 are problematic in that change in the light-branching ratio affects the measurement value, and thus reduces the measuring precision.

To avoid this problem, Patent Document 5 attempts to stabilize the measuring precision by adding a mechanism that ensures a constant temperature at the light-branching unit, but this is problematic from a practical point of view, since it complicates the configuration and increases the cost by requiring a temperature-controlling mechanism.

A method where light emitted from the optical fiber is received in another fiber (e.g. see Patent Documents 7 to 9) is also proposed. This method can measure light power without using a light-branching element.

However, in Patent Documents 7 and 8, to receive a large light power, a light-receiving fiber is made by bundling an optical fiber for guiding light with a multimode fiber and a plurality of optical fibers, thereby making modes in the optical fiber liable to change according to temperature, changes in the wavelength of the light source, and external pressure on the optical fiber. Since these mode-changes lead to a decline in measuring precision, highly precise measuring becomes difficult.

In Patent Document 9, a detecting unit uses a lens system to receive a large light power. The configuration consequently becomes complex and more expensive; in addition, there is a problem that measuring precision is liable to decline due to the external environment (temperature, vibrations, etc.).

As explained above, the prior art has not realized a temperature-compensated optical fiber sensor that measures temperature inexpensively and highly precisely, and then uses that temperature data.

Patent Document 1: Japanese Patent Application, First Publication No 60-50402
Patent Document 2: Japanese Patent Application, First Publication No. 5-196528
Patent Document 3: Japanese Patent Application, First Publication No. 9-005028
Patent Document 4: Japanese Patent Application, First Publication No, 2002-267557
Patent Document 5: Japanese Patent Application, First Publication No. 2002-372472
Patent Document 6: Japanese Patent Application, First Publication No. 8-62080
Patent Document 7: U.S. Pat. No. 5,017,772
Patent Document 8: U.S. Pat. No. 4,479,717
Patent Document 9: U.S. Pat. No. 6,433,350

DISCLOSURE OF THE INVENTION

Problems to Be Solved by the Invention

The present invention has been achieved in view of the above circumstances, and aims to provide an optical fiber thermometer that is inexpensive and can measure temperature with high precision, and a temperature-compensated optical fiber sensor that uses the optical fiber thermometer in compensating measurement error resulting from temperature-change, and can thereby achieve highly precise measuring.

Technical Solution

To achieve the above objectives, the invention provides an optical fiber thermometer including one optical fiber for projection that relays light from a light source to a measuring unit, two optical fibers for light-reception that relay light reflected from a reflecting face of a mirror provided at the measuring unit to two light-receiving units, and an arithmetic processing circuit that calculates the temperature of the measuring unit from the ratio of electrical signals from the two light-receiving units, and wherein end surfaces of three optical fibers arranged to face the reflecting face being fixed such that an angle θ between the longitudinal direction of the optical fibers and the normal to the reflecting face is not zero, the two optical fibers for light-reception being parallel, fixing angles between each of them and the optical fiber for projection being symmetrical based on the normal to the reflecting face as a reference, and each of the optical fibers being a single-mode fiber at the wavelength being used.

The angle θ is preferable equal to or greater than 8°.

Preferably, in the optical fiber thermometer of the invention, a three-core array for measuring temperature is formed by fixing measuring unit-side ends of the optical fiber for projection and the two optical fibers for light-reception to a V-groove array substrate, and the measuring unit is composed by fixing the three-core array for measuring temperature and said mirror to an array-fixing base material.

Preferably, in the optical fiber thermometer of the invention, the linear expansion coefficient of the base material of the mirror is smaller than the linear expansion coefficient of the material of the array-fixing base material.

Preferably, in the optical fiber thermometer of the invention, the linear expansion coefficient of the array-fixing base material is within a range of $8.6 \times 10^{-6}$ to $27 \times 10^{-6}$ mm/mm/° C.

Preferably, in the optical fiber thermometer of the invention, the three-core array for measuring temperature includes the V-groove array substrate made from quartz glass and an optical fiber holding lid.

The invention further provides a temperature-compensated optical fiber sensor that uses two optical-type physical sensors, and compensates the temperature-dependency of one optical-type physical sensor with a temperature measured by the other; the other sensor that measures the temperature is the optical fiber thermometer described above.

Preferably, in the temperature-compensated optical fiber sensor of the invention, the other sensor comprises one optical fiber for projection that relays light from the light source to a measuring unit, two optical fibers for light-reception that relay light reflected from a reflecting face of a mirror provided at the measuring unit to two light-receiving units, and an arithmetic processing circuit that calculates the pressure of the measuring unit from the ratio of electrical signals from the two light-receiving units; end surfaces of three optical fibers arranged to face the reflecting face being fixed such that an angle θ between the longitudinal direction of the optical fibers and the normal to the reflecting face is not zero, the two optical fibers for light-reception being parallel, fixing angles between each of them and the optical fiber for projection being symmetrical based on the normal to the reflecting face as a reference, and each of the optical fibers being a single-mode fiber at the wavelength being used.

The angle θ is preferably equal to or greater than 4°.

Preferably, in the temperature-compensated optical fiber sensor of the invention, the measuring unit of the optical fiber thermometer and the measuring unit of the pressure sensor are arranged adjacent to a same outer casing.

Preferably, in the temperature-compensated optical fiber sensor of the invention, the mirror of the pressure sensor is fixed to a diaphragm attached to the outer casing.

Preferably, the temperature-compensated optical fiber sensor of the invention further includes a light-branching element that branches light from the light source and guides these lights to the optical fiber for projection of the optical fiber thermometer and the optical fiber for projection of the pressure sensor.

Advantageous Effects

The optical fiber thermometer of the invention includes one optical fiber for projection that relays light from the light source to a measuring unit, two optical fibers for light-reception that relay light reflected from a reflecting face of a mirror provided at the measuring unit to two light-receiving units, and an arithmetic processing circuit that calculates the pressure of the measuring unit from the ratio of electrical signals from the two light-receiving units; end surfaces of three optical fibers arranged to face the reflecting face being fixed such that an angle θ between the longitudinal direction of the optical fibers and the normal to the reflecting face is not zero, the two optical fibers for light-reception being parallel, fixing angles between each of them and the optical fiber for projection being symmetrical based on the normal to the reflecting face as a reference, and each of the optical fibers being a single-mode fiber at the wavelength being used. Therefore, with an inexpensive device configuration, temperature can be precisely measured based on changes in light power. The measuring precision can be further increased by making the angle θ equal to or greater than 8°.

Further, a three-core array for measuring temperature is formed by fixing measuring unit-side ends of the optical fiber for projection and the two optical fibers for light-reception to a V-groove array substrate, and the measuring unit is composed by fixing the three-core array for measuring temperature and said mirror to an array-fixing base material, Therefore, it is possible to provide an easy-to-manufacture and inexpensive optical fiber thermometer that has constant temperature-measuring capabilities.

Further, since the linear expansion coefficient of the base material of the mirror is smaller than the linear expansion coefficient of the material of the array-fixing base material, the linear expansion coefficient of the array-fixing base material is within a range of $8.6 \times 10^{-6}$ to $27 \times 10^{-6}$ mm/mm/° C., and/or the three-core array for measuring temperature includes the V-groove array substrate made from quartz glass and an optical fiber holding lid, measuring can be performed stably even in a repeated heat cycle, and measuring precision can be increased further.

The temperature-compensated optical fiber sensor of the invention uses two optical-type physical sensors, and compensates the temperature-dependency of one optical-type physical sensor with a temperature measured by the other, the other sensor that measures the temperature being the optical fiber thermometer according to the invention. The optical-type physical sensor thus takes a highly precise measurement of the temperature, and the measurement data of the optical-type physical sensor is temperature-compensated based on this temperature data, thereby enabling an inexpensive device to make an accurate temperature-compensated measurement of the physical quantity.

Furthermore, by configuring one optical-type physical sensor having the structure which is similar or altering only the fixing angle of the fiber to the optical fiber thermometer, it becomes possible to provide an inexpensive temperature-compensated optical fiber sensor using joint components.

Furthermore, the measuring unit of the optical fiber thermometer and the measuring unit of the pressure sensor are preferably arranged adjacent to the same outer casing.

Furthermore, by configuring the mirror of the optical-type physical sensor so as to fix to a diaphragm attached to the outer casing, a highly precise pressure sensor can be provided.

Furthermore, by configuring the temperature-compensated optical fiber sensor of the invention so as to include a light-branching element that branches light from the light source and guides these lights to the optical fiber for projection of the optical fiber thermometer and the optical fiber for projection of the pressure sensor, it becomes possible to reduce the number of optical elements used, and thereby provide a temperature-compensated optical fiber sensor that is yet more inexpensive.

REFERENCE NUMERALS

Figure 1:
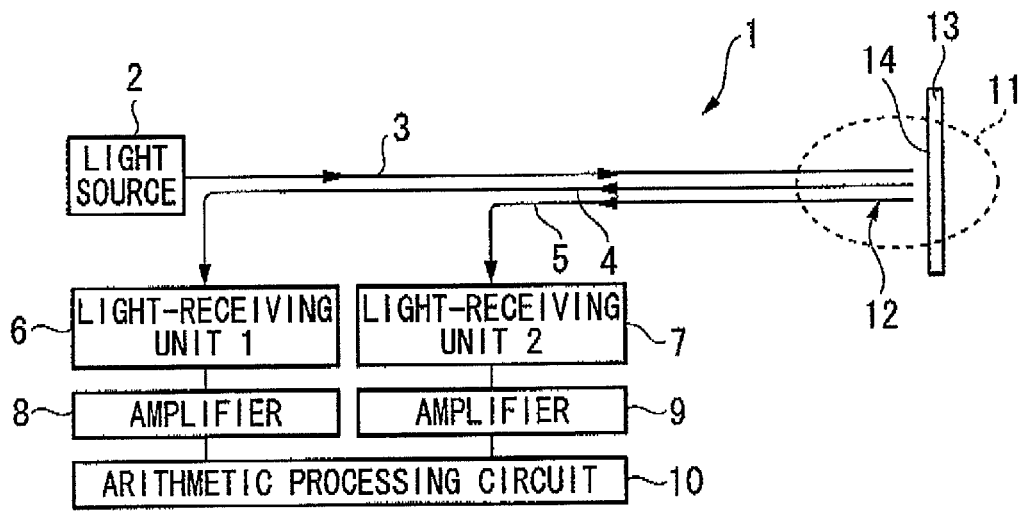
[FIG. 1] A diagram configuration diagram of an embodiment of an optical fiber thermometer of the invention.

1 Optical fiber thermometer
2 Light source
3 Optical fiber for projection
4, 5 Optical fibers for light-reception
3A to 5A Cores
6, 7 Light-receiving units
8, 9 Amplifiers
10 Arithmetic processing circuit
11 Measuring unit
12 Three-core array for measuring temperature
13 Mirror
14 Reflecting face
15 V-groove array substrate
16 Optical fiber holding lid
17 Array-fixing base material
18 Adhesive agent
20 Temperature-compensated optical fiber sensor
21 Pressure sensor
22 Light source
23 Optical fiber for projection
24, 25, Optical fibers for light-reception
26, 27 Light-receiving units
28, 29 Amplifiers
30 Arithmetic processing circuit
31 Measuring unit
32 Three-core array for measuring pressure
33 Mirror
34 Reflecting face
35 Diaphragm
36 Outer casing
37 Light-branching element

BEST MODES FOR CARRYING OUT THE INVENTION

An embodiment of the invention will be explained with reference to the drawings.

Figure 2:
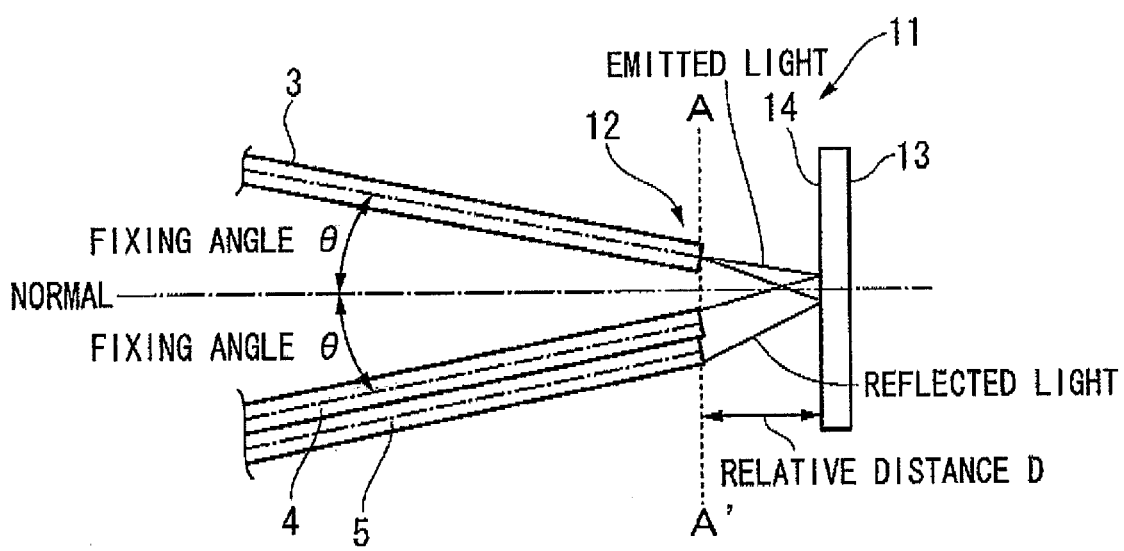
[FIG. 2] An enlarged configuration diagram of a measuring unit of the same optical fiber thermometer.
Figure 7:
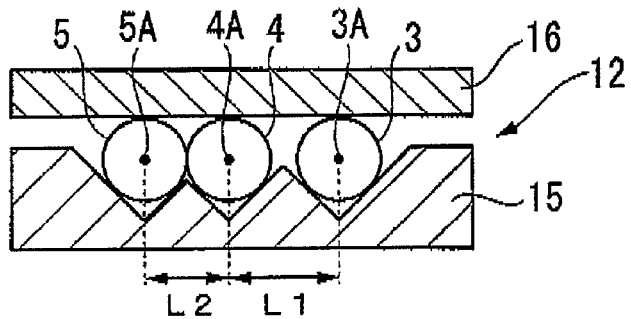
[FIG. 7] A partial cross-sectional view taken along A-A' in FIG. 2.
Figure 8:
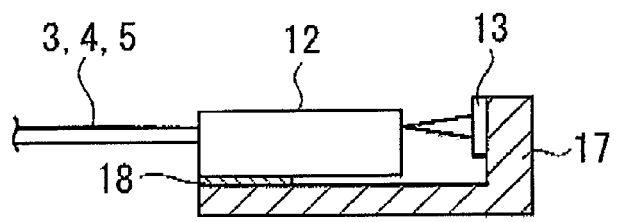
[FIG. 8] A side plan view of a measuring unit of an optical fiber thermometer of this embodiment.

FIGS. 1 to 2 and FIGS. 7 to 8 are diagrams of an embodiment of an optical fiber thermometer of the invention, FIG. 1 being a configuration diagram of an optical thermometer, FIG. 2, an enlarged configuration diagram of a measuring unit of the same optical fiber thermometer, FIG. 7, a cross-sectional view along the line A-A' of FIG. 2, and FIG. 8, a side view of the configuration of a measuring unit. In these diagrams, reference numeral 1 represents an optical fiber thermometer, 2 represents a light source, 3 represents an optical fiber for projection, 4 and 5 represent optical fibers for light-reception, 3A to 5A represent cores, 6 and 7 represent light-receiving units, 8 and 9 represent amplifiers, 10 represents an arithmetic processing circuit, 11 represents a measuring unit, 12 represents a three-core array for measuring temperature, 13 represents a mirror, 14 represents a reflecting face, 15 represents a V-groove array substrate, 16 represents an optical fiber holding lid, 17 represents an array-fixing base material, and 18 represents an adhesive agent.

The optical fiber thermometer 1 of this embodiment includes one optical fiber for projection 3 that relays light from a light source 2 to a measuring unit 11, two optical fibers for light-reception 4 and 5 that relay light reflected from a reflecting face 14 of a mirror 3 provided at the measuring unit 11 to two light-receiving units 6 and 7 respectively, and an arithmetic processing circuit 10 that calculates the temperature of the measuring unit 11 from the ratio of electrical signals from the two light-receiving units 6 and 7. End surfaces of three optical fibers arranged to face the reflecting face 14 are fixed such that the angle θ between the longitudinal direction of the optical fibers and the normal to the reflecting face is greater than 8 degrees, the optical fibers for light-reception 4 and 5 are parallel, the fixing angles between each of them and the optical fiber for projection 3 being symmetrical based on the normal to the reflecting face 14 as a reference; in addition, each of the optical fibers 3 to 5 is a single-mode fiber at the wavelength being used.

In this embodiment, as shown in FIGS. 7 and 8, the three-core array for measuring temperature 12 is formed by fixing measuring unit-side ends of the optical fiber for projection 3 and the two optical fibers for light-reception 4 and 5 to a V-groove array substrate 15, and the measuring unit 11 is composed by fixing the three-core array for measuring temperature 12 and the mirror 13 to the array-fixing base material 17.

The linear expansion coefficient of the base material of this mirror 13 is preferably smaller than the linear expansion coefficient of the material of the array-fixing base material 17.

Further, the linear expansion coefficient of the array-fixing base material 17 is preferably within the range of $8.6\times10^{-6}$ to $27\times10^{-6}$ mm/mm/° C.

Moreover, the three-core array for measuring temperature 12 preferably includes a V-groove array substrate 15 made from quartz glass and the optical fiber holding lid 16.

Subsequently, the three-core array for measuring temperature 12 (hereinafter sometimes abbreviated as 'three-core array'), and a thermometer and a temperature-compensated structure that use the three-core array will be explained.

(Principles of Three-Core Array Measuring)

As shown in FIG. 1, measuring using a three-core array is realized with a configuration including a measuring unit 11 that includes a reflecting face 14 and whose relative distance to the end surface of the optical fiber changes in accordance with a physical quantity such as pressure or temperature, the optical fiber for projection 3 that relays light from the light source 2 to the measuring unit 11, the optical fibers for light-reception 4 and 5 that relay light reflected from the reflecting face 14 of the measuring unit 11 to two light-receiving units 6 and 7 respectively, and an arithmetic processing circuit 10 that takes a ratio of electrical signals from two light-receiving units 6 and 7, and calculates a physical quantity. The end surfaces of three optical fibers arranged opposite the reflecting face 14 are fixed such that an angle between the longitudinal direction of the optical fibers and the normal to the reflecting face is θ.

FIG. 2 is an enlarged view of the measuring unit 11. As shown in FIG. 2, two optical fibers for light-reception 4 and 5 are parallel, and are fixed such that the fixing angles between each of them and the optical fiber for projection 3 are symmetrical based on the normal to the reflecting face 14 as a reference. Light emitted from the optical fiber for projection 3 is reflected by the reflecting face 14, coupled by the two optical fibers for light-reception 4 and 5, and resultant reflected lights are transmitted to the light-receiving units 6 and 7 respectively. The optical fiber for projection 3 and the optical fibers for light-reception 4 and 5 use optical fibers which propagate in a single mode at the used-wavelength along their entire lengths. This is to prevent deterioration in precision resulting from changes in the power distribution between modes when multi-mode optical fibers are used. Here, the used wavelength means the peak wavelength of the spectrum of the light power at the light source being used. When single-mode optical fibers are used, although the small core radius makes it difficult to increase the light power, precise measurements can be taken by performing electrical processes after A/D conversion, such as digital fast Fourier conversion (FFT) or increasing the integration time of the measurement calculation to more than 100 ms. The arithmetic processing circuit 10 required for this can be inexpensively acquired.

Figure 3:
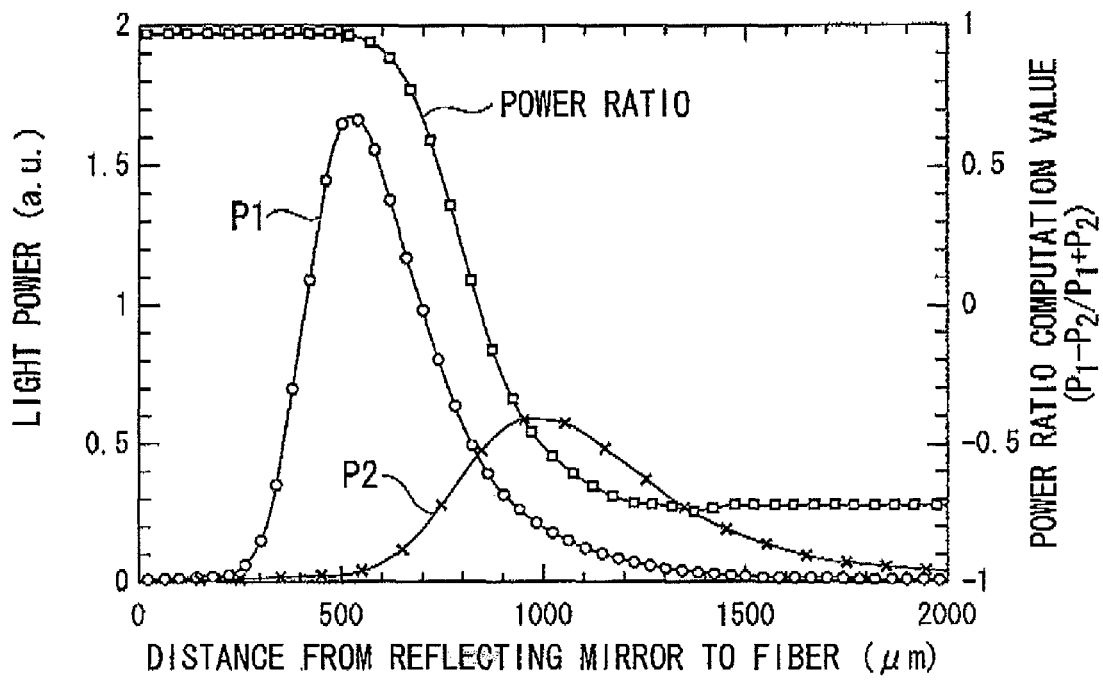
[FIG. 3] A graph of measurements taken by an optical fiber thermometer of the invention, illustrating the relationship between distance from a reflecting mirror to a fiber, light power, and power ratio.

FIG. 3 is a graph of the relationship between reflected light powers P1 and P1 of the optical fibers for light-reception 4 and 5 and the power ratio with respect to changes in the relative distance D between side faces of the optical fibers 3 to 5 and the reflecting face 14 (hereinafter 'distance-dependency'). Here, the power ratio is denoted by a power ratio computation value F (P1, P2)=(P1−P2)/(P1+P2). In FIG. 3, the horizontal axis represents the relative distance D, the left-vertical axis represents the light power, and the right-vertical axis represents the power ratio computation value. The reflected light powers P1 and P1 are curves which peak at different points. This is because the fibers are fixed at a nonzero angle θ. The power ratio obtained between their peaks is therefore a curve having a roughly linear monotonous change. This monotonous changing part is used when measuring the relative distance D between the reflecting face 14 and the array based on a change in physical quantity. The measuring sensitivity is expressed as slope of curve Δ=dF (P1, P2)/dD, the measuring sensitivity increasing as Δ becomes larger.

Since the temperature form using the three-core array uses the ratio between P1 and P2 as a measurement even if the light power of the light source changes, the measurement does not change, enabling measuring to be performed stably, Also, since no light-branching element is used from the measuring unit 11 to between the light-receiving units 6 and 7, changes in the wavelength of the light source 2 have negligible effect, whereby high-precision measuring is possible. This allows high-precision measuring even when using a comparatively inexpensive LED light source or such like.

Figure 4:
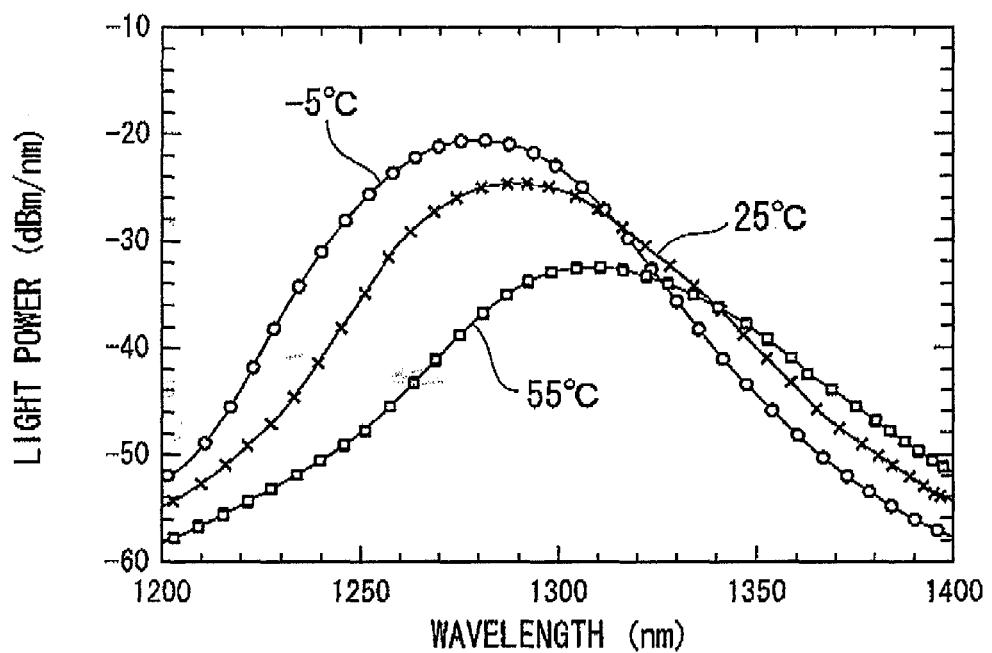
[FIG. 4] A graph of emitted light spectrums at different temperatures of an LED used as a light source.

FIG. 4 is a graph of emitted light spectrums at different temperatures of an LED used as the light source 2.

Figure 5:
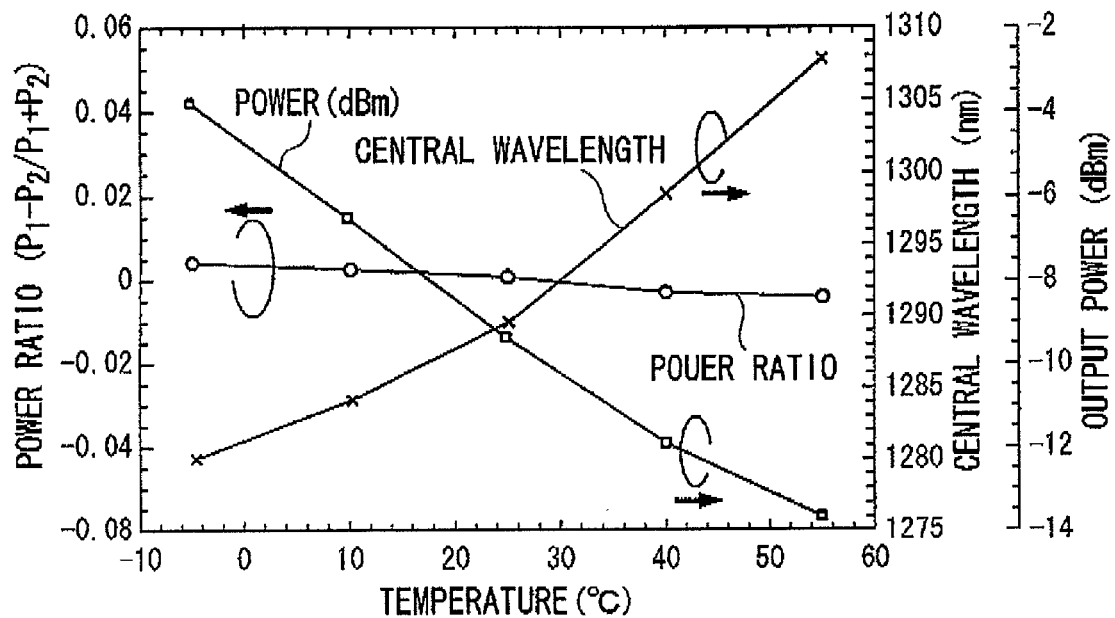
[FIG. 5] A graph of LED characteristics (central wavelength and output power) and temperature-dependency of the power ratio measured with the three-core array described above.

FIG. 5 is a graph of LED characteristics (central wavelength and output power) and temperature-dependency of the power ratio measured with the three-core array described above.

In this way, even when the light-generation central wavelength and output power change considerably, the power ratio measured with the three-core array does not greatly change, and stable measuring is possible.

Figure 6:
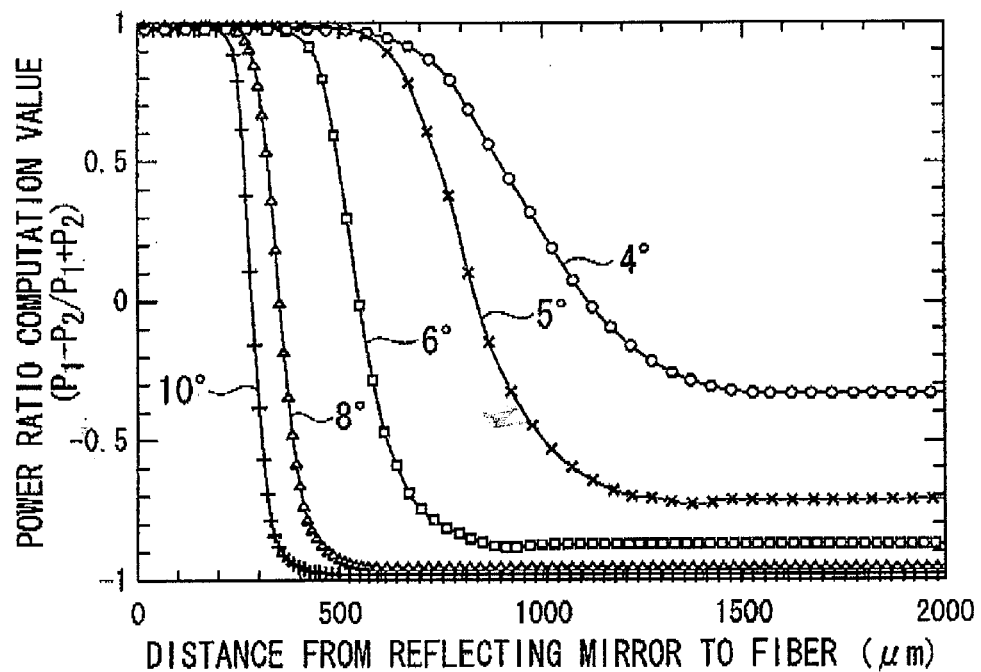
[FIG. 6] A graph of measurements taken by the optical fiber thermometer of this invention, illustrating the relationship between the distance from the reflecting mirror to the fibers and power ratio computation value when a fixing angle θ is changed.

FIG. 6 is a graph of the distance-dependency of power ratio computation values measured using a three-core array at different fiber fixing angles θ. When the fixing angle θ is increased, the peak positions of P1 and P2 approach the reflecting face and Δ increases; conversely, when the fixing angle θ is made smaller, the peak positions move away from the reflecting face and Δ decreases. Since Δ changes when the fixing angle θ changes, measuring sensitivity can be selected easily by utilizing this fact. The measuring range, i.e. the relative distance range where a linear slope exists at distance-dependency, becomes a trade-off with the measuring sensitivity, the measuring range becoming narrower as the measuring sensitivity increases and becoming larger as the measuring sensitivity decreases. Furthermore, since the distance from the reflecting mirror to the fiber that constitutes the measuring range increases as θ decreases, the reflected light powers P1 and P2 also decrease.

Here, the three-core array used in the measuring of FIG. 6 and having the structure shown in FIG. 7 was manufactured using single-mode optical fibers used in optical communications and the V-groove array substrate 15 made from quartz glass. When fixing optical fibers at a fixing angle θ as shown in FIG. 2, the optical fibers can be precisely fixed by using a substrate that was subjected to V-groove machining such that the optical fibers fit inside. The optical fibers are provisionally aligned along the V-grooves, and are then fixed by resin with an optical fiber holding lid 16 made from quartz glass that was subjected to V-groove machining from above inserted therebetween. The optical fibers 3 to 5 can thus be fixed precisely in the same plane, with no fluctuation in the light power due to variation in their heights, and a decrease in measuring precision can be prevented. The reason for using quartz glass as the V-groove array substrate 15 is that the optical fibers are made of quartz glass, and the linear expansion coefficient between them can thus be made equal.

(Structure of Measuring Unit and Temperature-Compensation Method)

FIG. 8 is an example of a configuration of the measuring unit 11 using the three-core array for measuring temperature 12.

The measuring unit 11 is configured by fixing the three-core array for measuring temperature 12, which the optical fibers 3 to 5 are fixed to, to the array-fixing base material 17, and the mirror 13 that reflects lights from the optical fibers is similarly fixed to the array-fixing base material 17. When the environmental temperature changes, the array-fixing base material 17 thermally expands, changing the distance from the fiber side faces to the mirror 13, whereby the measurement value changes and the temperature can be measured. It was confirmed that when the V-groove array substrate 15 of the three-core array 12 is attached to the array-fixing base material 17 with screws or the like, warpage occurs between the three-core array 12 and the array-fixing base material 17, increasing hysteresis and the like due to temperature-change, and making stable measuring impossible. Therefore, it is preferable to fix the three-core array 12 to the array-fixing base material 17 with an adhesive agent 18. However, since a thermosetting adhesive agent makes the base material expand during heat hardening, causing large warpage in the adhesive surface after hardening, it is better to use an ultraviolet-hardening resin to obtain a sensor having superior reproducibility in repeated measuring.

It is preferable that the array-fixing base material 17 has a large linear expansion coefficient to increase the distance fluctuations due to temperature-change, however, if it is too large, the linear expansion difference with the three-core array for measuring temperature 12 will increase, leading to greater warpage in the adhesive part 18 and making measuring unstable. When using magnesium having a linear expansion coefficient of approximately $27 \times 10^{-6}$ (mm/mm/°C. this unit will be omitted hereafter) as the array-fixing base material 17, in heat-cycle testing at −10° C. to 55° C., it was confirmed that characteristics fluctuate; whereas, when using aluminum (linear expansion coefficient=approximately $23 \times 10^{-6}$) or stainless steel (linear expansion coefficient=approximately $17 \times 10^{-6}$), stable measuring was possible. On the other hand, when the base material was made from titanium (linear expansion coefficient=approximately $8.6 \times 10^{-6}$), the linear expansion coefficient decreased and the measuring sensitivity was too low. Therefore, the linear expansion coefficient of the material for the array-fixing base material 17 is preferably greater than $8.6 \times 10^{-6}$ and lower than $23 \times 10^{-6}$.

When the array-fixing base material 17 is made from a material having a small linear expansion coefficient, such as quartz glass, as shown in FIG. 8, with regard to the adhesion of the three-core array 12 and the array-fixing base material 17, greater distance-change is obtained by fixing them at a considerable distance from the mirror 13. Considering an area of the adhesive surface, adhesive strength, and so on, it is better to fix them at a distance of more than half of the three-core array, on the side that is far from the mirror 13. Moreover, by ensuring that the linear expansion coefficient of the base material of the mirror 13 is smaller than that of the array-fixing base material 17, greater distance fluctuation due to temperature-change can be obtained. For this reason, a material whose linear expansion coefficient is smaller than that of the array-fixing base material 17 should be used as the base material of the mirror 13. Specifically, a glass base material with a reflecting film deposited thereon can be used in constituting the mirror 13.

When using the measuring unit 11 made with the configuration described above, distance-change of approximately 10 to 30 μm was obtained at temperature-change from −20° C. to 100° C. When the angle θ is not zero, measuring can be performed at any array angle; however, based on the distance-dependency data shown in FIG. 6, it is preferable that the optical fixing angle θ is equal to or greater than 8° in order to increase the measuring sensitivity. On the other hand, a fixing angle θ of greater than 10° will not greatly affect the characteristics; in addition, the distance between the reflecting mirror and the end surfaces of the optical fibers will be too short, making manufacture difficult; for this reason, there is little point in increasing the fixing angle θ above 10°. It is particularly impractical to set the fixing angle θ greater than 20°, since the distance between the end surfaces of the optical fibers and the reflecting mirror will be too short, and coupling with the optical fibers 1 and 2 will also be unlikely to occur.

Figure 9:
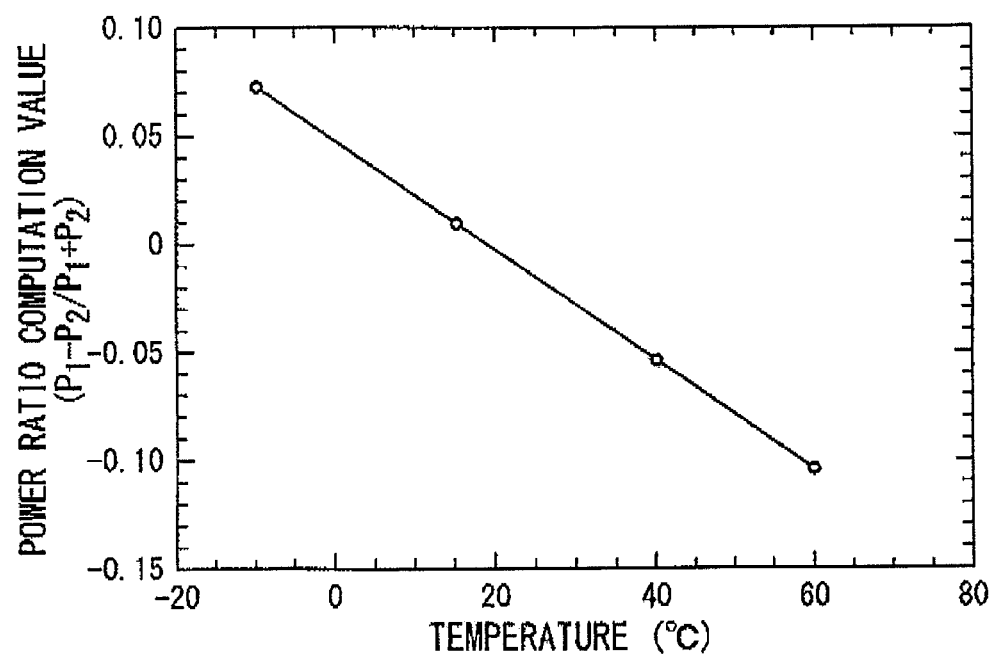
[FIG. 9] A graph of temperature measurements taken by the optical fiber thermometer of this embodiment.

FIG. 9 is a graph of temperature measurements taken using the optical fiber thermometer 1 that includes the measuring unit 11 configured as described above. As shown in FIG. 9, the measurement value changes almost linearly due to temperature-change, confirming that it can be used as a thermometer. Therefore, it was confirmed that the optical fiber thermometer 1 manufactured with the configuration described above can be used as an inexpensive and highly precise thermometer, In this configuration, a three-core array 12 with a fixing angle θ of 10° was fixed to an array-fixing base material 17 made of stainless steel (SUS316). A glass substrate with aluminum deposited thereon was used as a mirror 13, An LED light source having a central wavelength of approximately 1.3 μm was used as a light source 2, and photodiodes were used as light-receiving units 6 and 7. Electrical signals obtained from the photodiodes were converted to voltage signals by operational amplifiers used as amplifiers 8 and 9, and then calculated by an arithmetic processing circuit 10.

Subsequently, an embodiment of a temperature-compensated optical fiber sensor according to the invention will be explained.

Figure 10:
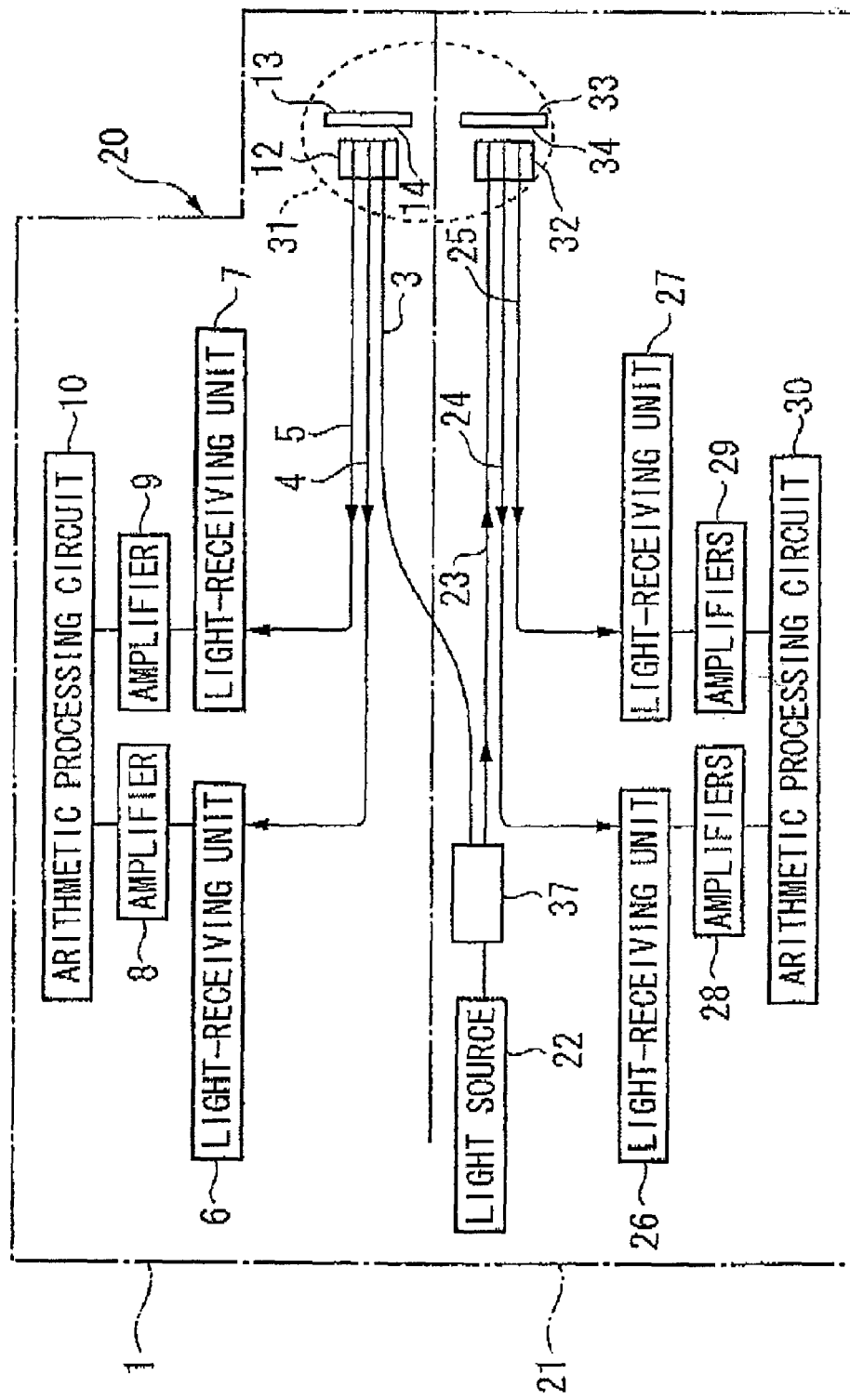
[FIG 10] A configuration view of a temperature-compensated pressure sensor, as an embodiment of a temperature-compensated sensor of the invention.
Figure 11:
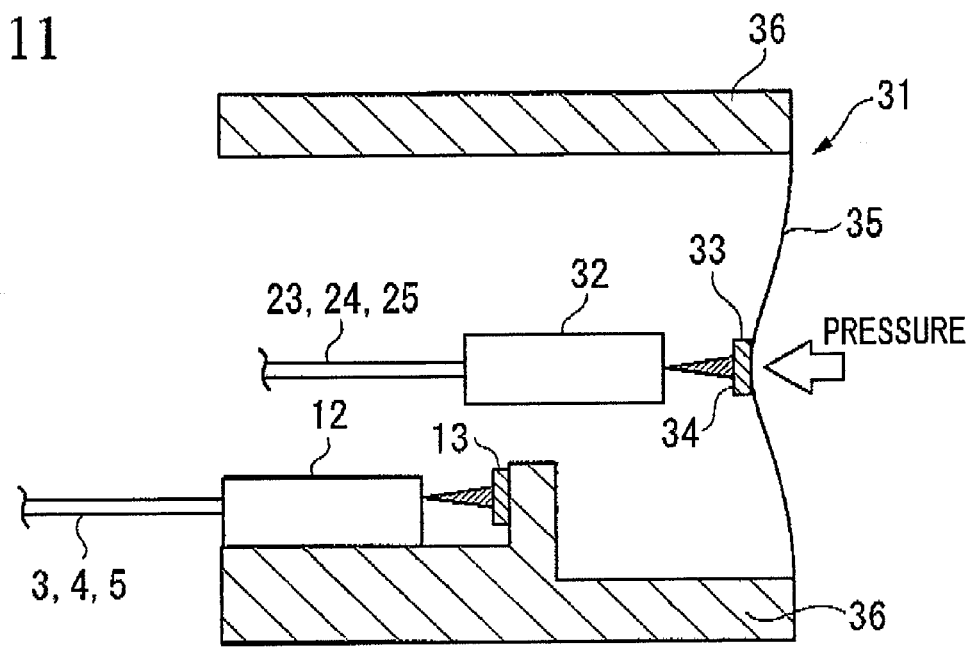
[FIG. 11] A cross-sectional side-face view of a measuring unit 11 of the same temperature-compensated pressure sensor.

FIG. 10 and FIG. 11 illustrate a temperature-compensated optical fiber sensor according to the invention, FIG. 10 being a configuration diagram of a temperature-compensated optical fiber sensor 20, and FIG. 11, a cross-sectional diagram of the structure of a measuring unit in the temperature-compensated optical fiber sensor 20. In FIGS. 10 and 11, reference numeral 20 represents a temperature-compensated optical fiber sensor, 21 represents a pressure sensor, 22 represents a light source, 23 represents an optical fiber for projection, 24 and 25 represent optical fibers for light-reception, 26 and 27 represent light-receiving units, 28 and 29 represent amplifiers, 30 represents an arithmetic processing circuit, 31 represents a measuring unit, 32 represents a three-core array for measuring pressure, 33 represents a mirror, 34 represents a reflecting face, 35 represents a diaphragm, 36 represents an outer casing, and 37 represents a light-branching element.

The temperature-compensated optical fiber sensor 20 of this embodiment uses two optical-type physical sensors, and compensates the temperature-dependency of one optical-type physical sensor with the temperature measured by the other; the optical fiber thermometer 1 described above is used as the other sensor that measures the temperature. While the temperature-compensated optical fiber sensor 20 of this embodiment uses a pressure sensor 21 as the one optical-type physical sensor, this is merely one example, and another type of optical-type physical sensor can be used instead of a pressure sensor.

In the temperature-compensated optical fiber sensor 20 of this embodiment, the pressure sensor 21 has the same configuration as the optical fiber thermometer 1 described earlier. That is, the pressure sensor 21 includes one optical fiber for projection 23 that relays light from the light source 22 to the measuring unit 31, two optical fibers for light-reception 24 and 25 that relay light reflected from a reflecting face 34 of a mirror 33 provided at the measuring unit 31 to two light-receiving units 26 and 27 respectively, and an arithmetic processing circuit 30 that calculates the pressure of the measuring unit 11 from the ratio of electrical signals from the two light-receiving units 24 and 25. End surfaces of three optical fibers arranged facing the reflecting face 34 are fixed such that an angle θ between the longitudinal direction of the optical fibers and the normal to the reflecting face is not zero, the optical fibers for light-reception 24 and 25 are parallel, the fixing angles between each of them and the optical fiber for projection 23 being symmetrical taking the normal with the reflecting face as a reference; in addition, each of the optical fibers 23 to 25 is a single-mode fiber at the wavelength being used.

At this time, the fiber fixing angle θ can be determined in correspondence with the amount of change due to changes in pressure. If the angle θ is smaller than 4°, sensitivity is low and the optical power is weak; preferably, therefore, the angle θ is equal to or greater than 4°.

In the temperature-compensated optical fiber sensor 20, the optical fiber thermometer 1 and the measuring unit 31 of the pressure sensor 21 are arranged adjacent to the same outer casing 36, and the mirror 33 of the pressure sensor 21 is fixed to a diaphragm 35 attached to the outer casing 36. On the measuring unit 31 side of the pressure sensor 21, in the same manner as the measuring unit 11 of the optical fiber thermometer 1 shown in FIGS. 7 and 8, there is provided a three-core way for measuring pressure 32 in which measuring-unit-side ends of the optical fiber for projection 23 and the two optical fibers for light-reception 24 and 25 have been fixed to a V-groove array base material. The diaphragm 35 bends in accordance with the difference between the outer pressure and inner pressure of the outer casing 36; as a result, the distance between the three-core array for measuring pressure 32 and the mirror 33 changes, thus enabling the pressure to be measured.

In the temperature-compensated optical fiber sensor 20 of this embodiment, the light from the light source 22 can be branched by a light-branching element 37 which is composed of an optical coupler and the like, and these branched lights are guided to the optical fiber for projection 3 of the optical fiber thermometer 1 and the optical fiber for projection 23 of the pressure sensor 21.

Light from the light source 22 is branched into two lights by the light-branching element 37, and these lights are guided to the separate three-core arrays 12 and 32. Whereas the measurement value of the pressure sensor 21 changes according to changes in the environmental temperature and the physical quantity being measured (pressure is measured here), changes in the measurement value at the optical fiber thermometer 1 depend only on temperature-change. At this time, by measuring a measurement value fluctuation of the pressure sensor 21 due to temperature-change beforehand, the temperature fluctuation portion of the pressure sensor 21 can be compensated by an arithmetic operation based on temperature measurements taken by the optical fiber thermometer 1, whereby only the physical quantity being measured is obtained. This configuration is advantageous in that, since the units for measuring the physical quantity being measured and the temperature are both configured as three-core arrays, their member procurement and manufacturing processes can be made communal. Further, by using the light-branching element 37, an inexpensive measuring system can be configured without requiring a plurality of light sources. Since the light-branching element 37 is not used between the measuring unit 31 and detectors 6, 7, 26, and 27, a change in the branching ratio of the light-branching element 37 has negligible effect on the measurement, allowing an inexpensive light-branching element to be used, e.g. a fused-fiber coupler.

FIG. 11 is a configuration diagram of a measuring unit 31 of the temperature-compensated pressure sensor in which the three-core array for measuring temperature 12 shown in FIG. 6 is combined with the three-core array for measuring pressure 32. The mirror 33 is fixed to the diaphragm 35, which changes according to the pressure, the change quantity is detected using the three-core array for measuring pressure 32.

In a specific example of a structure of the measuring unit 31, a diaphragm 35 that changes 200 μm with respect to a pressure of 400 kPa was used, The three-core array for measuring pressure 32 had a fixing angle θ of 5°. The configurations of the light source and the light-receiving units were the same as when measuring temperature in FIG. 9. Furthermore, for measuring the pressure, reflected light powers P3 and P4 of the optical fibers for light-reception 24 and 25 are measured, and the power ratio thereof which is denoted by a power ratio computation value (P3−P4)/(P3+P4) is calculated.

Figure 12:
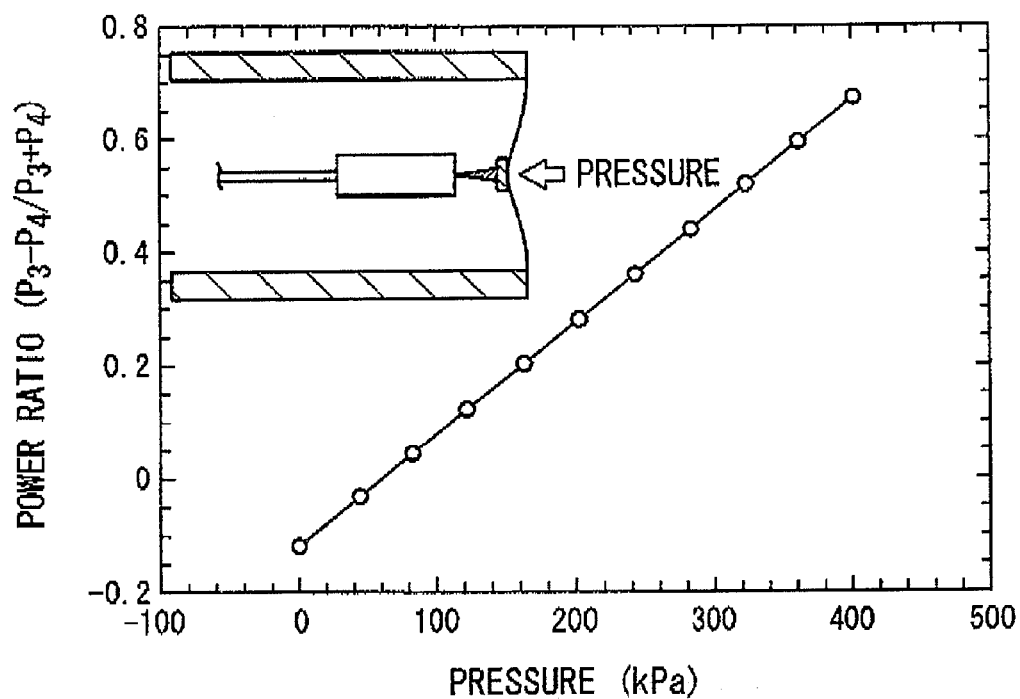
[FIG. 12] A graph of pressure measurements (temperature-uncompensated condition) taken using a pressure sensor that was manufactured in compliance with a specific example of a measuring unit of a temperature-compensated pressure sensor.

FIG. 12 is a graph of pressure measurements (temperature-uncompensated condition) that were taken using a pressure sensor 21 manufactured in compliance with the abovementioned specific example of the measuring unit 31. As shown in FIG. 12, in this pressure sensor 21, pressure change and power ratio are in a directly linear relationship, demonstrating sufficient capability as a pressure sensor.

Moreover, in the temperature-compensated optical fiber sensor 20 of this embodiment, the measuring unit 31 measures pressure change and temperature-change simultaneously, measures the effect of temperature-change on pressure change beforehand, and an arithmetic circuit subtracts that effect based on temperature information obtained from the array for measuring temperature, thereby realizing temperature compensation.

Figure 13:
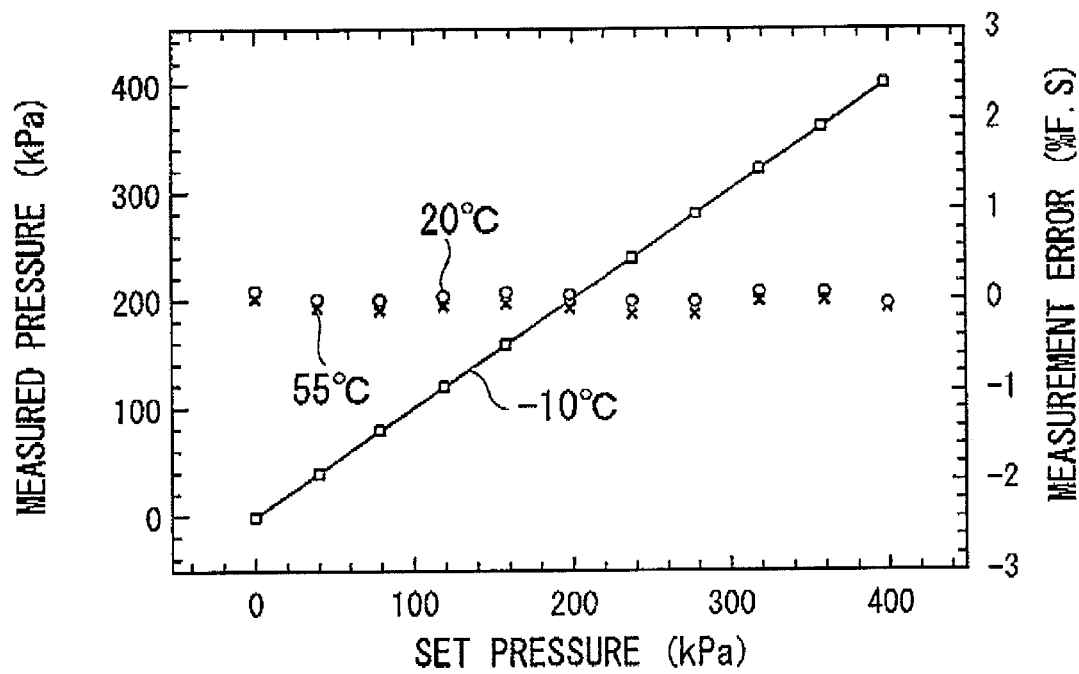
[FIG. 13] A graph of pressure measurements after making a temperature compensation computation based on temperature measurements.

FIG. 13 is a graph of pressure measurements after making a temperature-compensation computation based on temperature measurements. It confirms that measurements can be taken with high precision of ±0.2% across all pressure ranges (0 to 400 kPa) and temperature ranges (−10 to 55° C.).

INDUSTRIAL APPLICABILITY

According to the invention, it is possible to provide an optical fiber thermometer that can measure temperature inexpensively and highly precisely, and a temperature-compensated optical fiber sensor that uses the optical fiber thermometer in compensating measurement error due to temperature-change, and can achieve highly precise measuring.

The invention claimed is:

1. An optical fiber thermometer comprising: one optical fiber for projection that relays light from a light source to a measuring unit, two optical fibers for light-reception that relay light reflected from a reflecting face of a mirror provided at the measuring unit to two light-receiving units, and an arithmetic processing circuit that calculates the temperature of the measuring unit from the ratio of electrical signals from the two light-receiving units, wherein end surfaces of three optical fibers arranged to face the reflecting face being fixed such that an angle θ between the longitudinal direction of the optical fibers and the normal to the reflecting face is not zero, the two optical fibers for light-reception being parallel, fixing angles between each of them and the optical fiber for projection being symmetrical based on the normal to the reflecting face as a reference, and each of the optical fibers being a single-mode fiber at the wavelength being used.

2. The optical fiber thermometer according to claim 1, wherein the angle $\theta$ is equal to or greater than 8°.

3. The optical fiber thermometer according to claim 1, wherein a three-core array for measuring temperature is formed by fixing measuring unit-side ends of the optical fiber for projection and the two optical fibers for light-reception to a V-groove array substrate, and the measuring unit is composed by fixing the three-core array for measuring temperature and said mirror to an array-fixing base material.

4. The optical fiber thermometer according to claim 3, wherein the linear expansion coefficient of the base material of the mirror is smaller than the linear expansion coefficient of the material of the array-fixing base material.

5. The optical fiber thermometer according to claim 3, wherein the linear expansion coefficient of the array-fixing base material is within a range of $8.6 \times 10^{-6}$ to $27 \times 10^{-6}$ mm/mm/° C.

6. The optical fiber thermometer according to claim 3, wherein the three-core array for measuring temperature includes a V-groove array substrate made from quartz glass and an optical fiber holding lid.

7. A temperature-compensated optical fiber sensor that uses two optical-type physical sensors, and compensates the temperature-dependency of one optical-type physical sensor with a temperature measured by the other;
the other sensor that measures the temperature being the optical fiber thermometer according to claim 1.

8. The temperature-compensated optical fiber sensor according to claim 7, wherein one of the optical-type physical sensors which is not used as the thermometer comprises one optical fiber for projection that relays light from the light source to a measuring unit, two optical fibers for light-reception that relay light reflected from a reflecting face of a mirror provided at the measuring unit to two light-receiving units, and an arithmetic processing circuit that calculates the pressure of the measuring unit from the ratio of electrical signals from the two light-receiving units; end surfaces of three optical fibers arranged to face the reflecting face being fixed such that an angle $\theta$ between the longitudinal direction of the optical fibers and the normal to the reflecting face is not zero, the two optical fibers for light-reception being parallel, fixing angles between each of them and the optical fiber for projection being symmetrical based on the normal to the reflecting face as a reference, and each of the optical fibers being a single-mode fiber at the wavelength being used.

9. The temperature-compensated optical fiber sensor according to claim 8, wherein the angle $\theta$ is equal to or greater than 4°.

10. The temperature-compensated optical fiber sensor according to claim 9, wherein the measuring unit of the optical fiber thermometer and the measuring unit of the pressure sensor are arranged adjacent to a same outer casing.

11. The temperature-compensated optical fiber sensor according to claim 10, wherein the mirror of the pressure sensor is fixed to a diaphragm attached to the outer casing.

12. The temperature-compensated optical fiber sensor according to claim 9, comprising a light-branching element that branches light from the light source and guides these lights to the optical fiber for projection of the optical fiber thermometer and the optical fiber for projection of the pressure sensor.

* * * * *